(12) United States Patent
Kawauchimaru et al.

(10) Patent No.: US 7,232,153 B2
(45) Date of Patent: Jun. 19, 2007

(54) LEG PROTECTION DEVICE

(75) Inventors: Masatoshi Kawauchimaru, Saga (JP); Masayoshi Kumagai, Shiga-ken (JP)

(73) Assignee: Takata Corporation, Tokyo (JP)

( * ) Notice: Subject to any disclaimer, the term of this patent is extended or adjusted under 35 U.S.C. 154(b) by 306 days.

(21) Appl. No.: 10/811,393

(22) Filed: Mar. 29, 2004

(65) Prior Publication Data
US 2004/0178607 A1    Sep. 16, 2004

(30) Foreign Application Priority Data

May 30, 2003 (JP) ............................. 2003-155042
Jul. 10, 2003 (JP) ............................. 2003-195147
Dec. 26, 2003 (JP) ............................. 2003-432731

(51) Int. Cl.
*B60R 21/16* (2006.01)

(52) U.S. Cl. ................................. 280/743.1; 280/730.1

(58) Field of Classification Search ............. 280/730.1, 280/728.1, 732, 743.1
See application file for complete search history.

(56) References Cited

U.S. PATENT DOCUMENTS 5,492,367 A * 2/1996 Albright et al. ......... 280/743.1
5,496,056 A * 3/1996 Dyer ........................ 280/728.1
6,739,622 B2 * 5/2004 Halford et al. ......... 280/743.1
2003/0107206 A1   6/2003 Takimoto et al.

FOREIGN PATENT DOCUMENTS

EP        0 957 007        11/1999
EP        1 336 537        1/2003

* cited by examiner

*Primary Examiner*—Paul N. Dickson
*Assistant Examiner*—Tiffany L. Webb
(74) *Attorney, Agent, or Firm*—Manabu Kanesaka

(57) ABSTRACT

A leg protection device includes an airbag to be inflated in front of a leg portion of an occupant for protecting the leg portion; a casing for storing a folded airbag; and a gas generating device for inflating the airbag. The airbag is formed of a front panel facing the occupant and a rear panel at the opposite side of the front panel when the airbag is inflated. The airbag has a folded portion folded into the airbag between the front panel and the rear panel at a perimeter of the airbag.

10 Claims, 16 Drawing Sheets

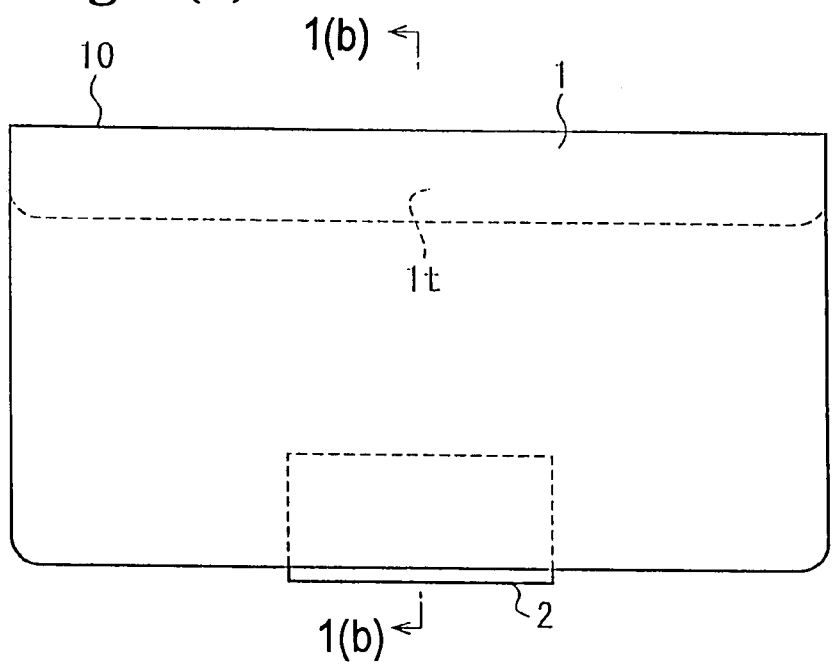
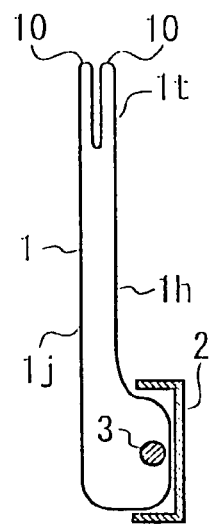
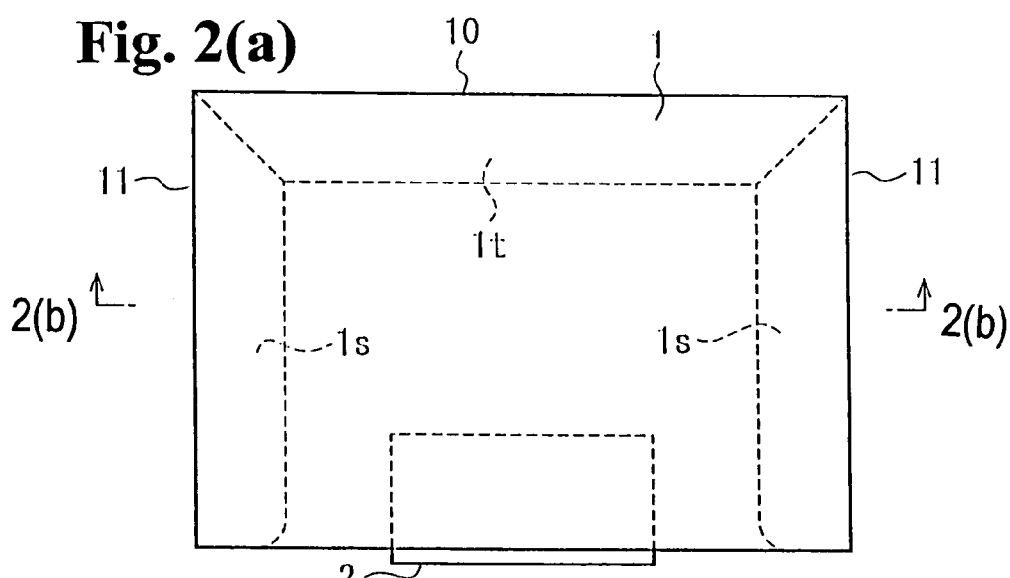
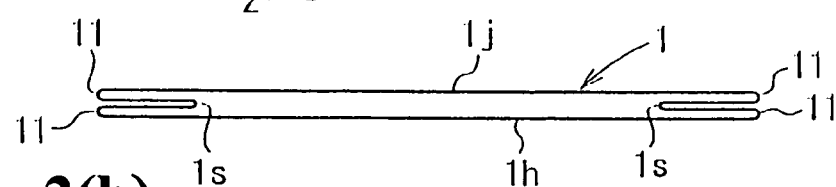

Fig. 9(a)
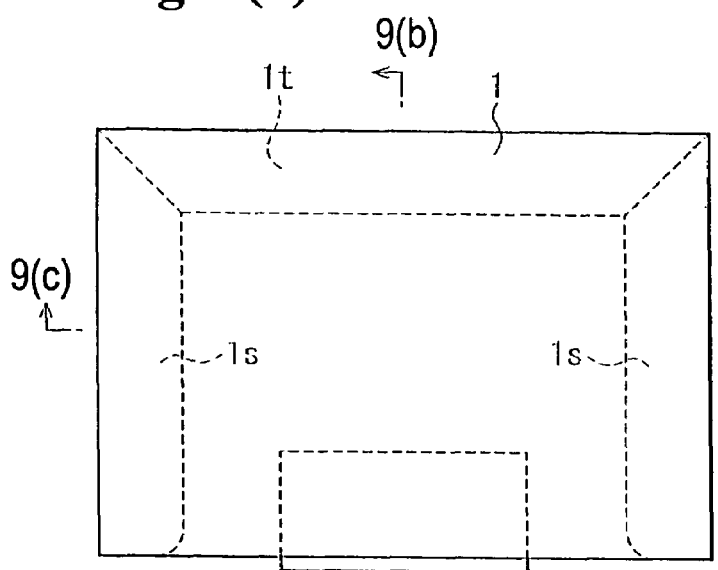
Fig. 9(b)
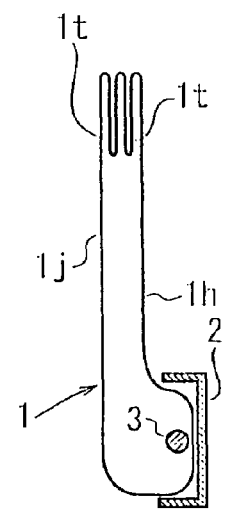
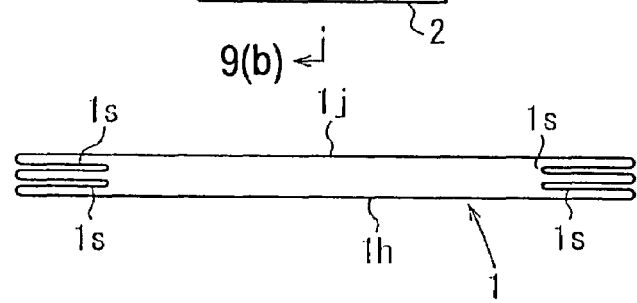
Fig. 9(c)
Fig. 10(a)
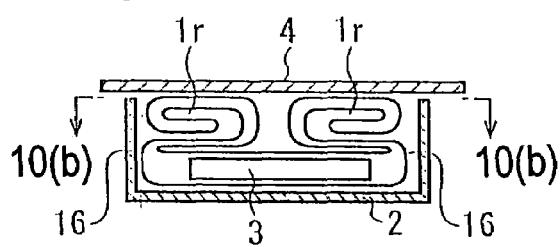
Fig. 10(b)
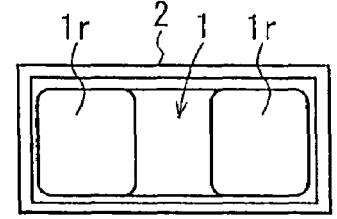

Fig. 13(a)
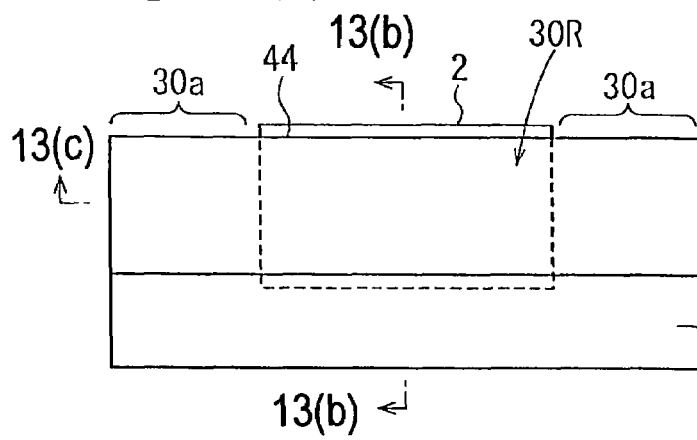
Fig. 13(b)
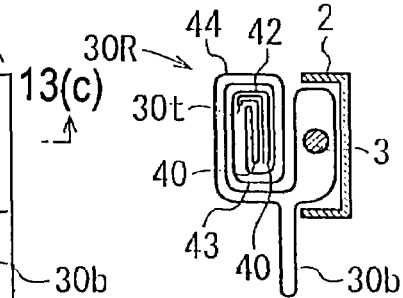
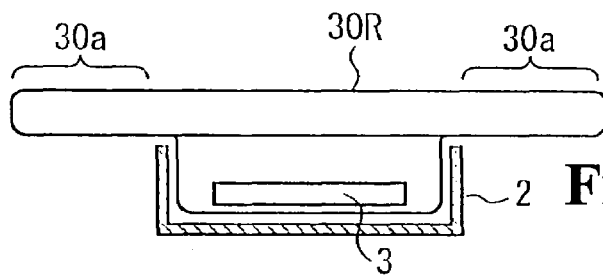
Fig. 13(c)
Fig. 14(a)
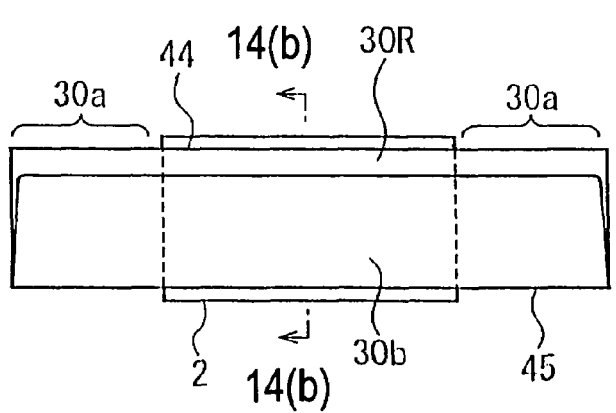
Fig. 14(b)
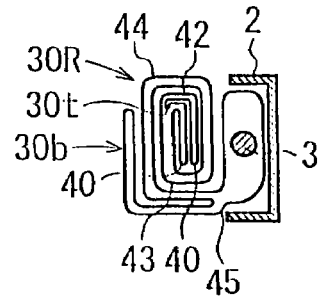

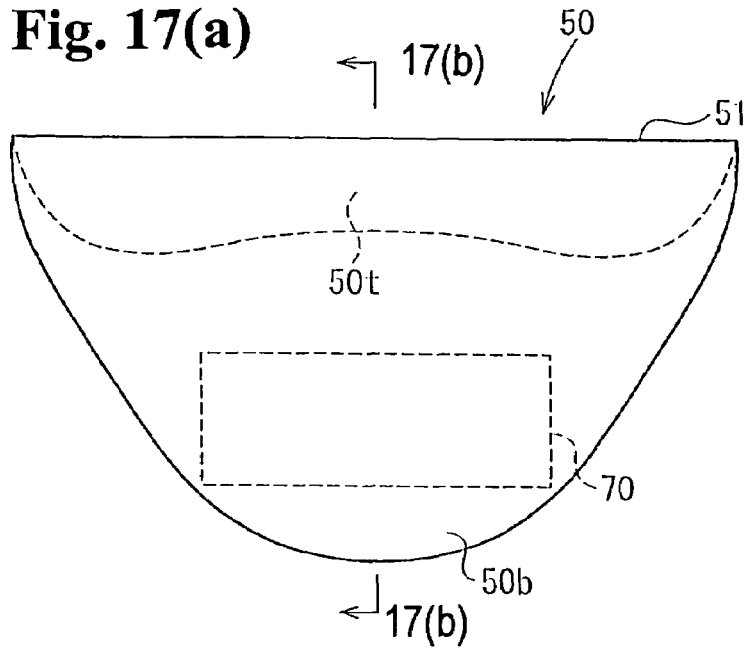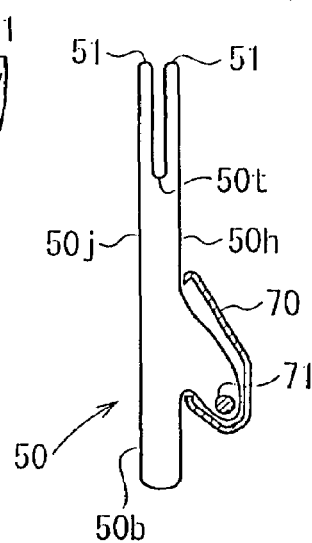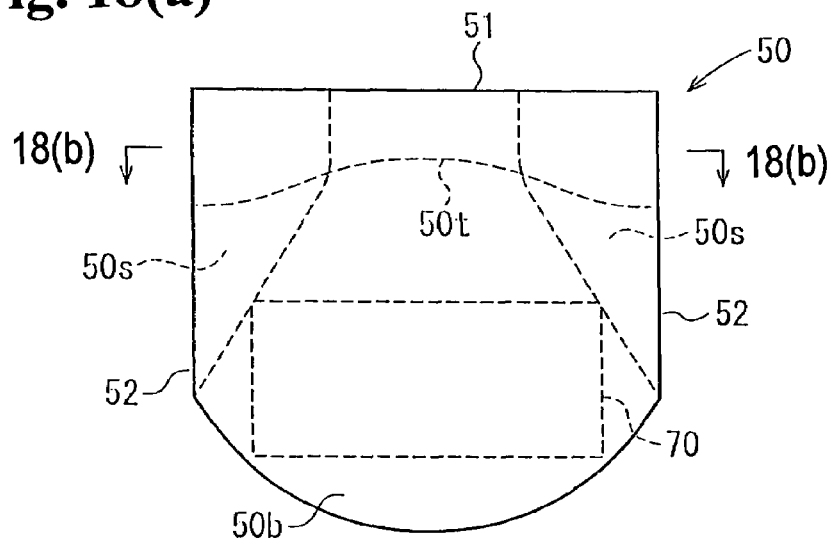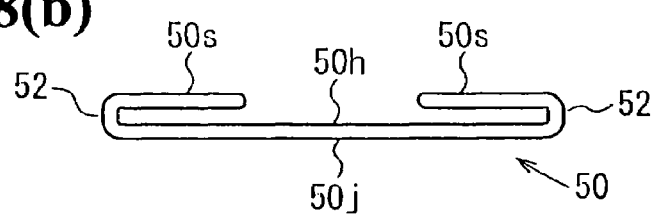

LEG PROTECTION DEVICE

BACKGROUND OF THE INVENTION AND RELATED ART STATEMENT

The present invention relates to a leg protection device provided in an instrument panel of a vehicle, and particularly to a device wherein an airbag, i.e. a knee bag or knee airbag, is inflated in front of a leg of an occupant for protecting the leg in case of collision of a high-speed object such as a vehicle.

A leg protection device has been well known wherein an airbag device is installed in an interior member in front of a seat of an automobile around a height of a lower leg of an occupant. The airbag device is inflated at the time of collision of the automobile for receiving the leg of the occupant, particularly, a lower portion thereof under a knee. The leg protection device comprises a folded airbag, a casing for storing the airbag, a gas generator for inflating the airbag, a lid member for covering a front face of the casing, and the like.

Japanese Patent Publication (Kokai) No. 2002-249016 has disclosed an airbag device wherein both left and right sides of an airbag are folded with pleats toward an instrument panel such that a width of the airbag is smaller than a width of the casing, and the airbag is rolled into a rolled portion around an axis along a horizontal direction of the occupant, so that the folded airbag is stored into the casing.

The airbag disclosed in Japanese Patent Publication (Kokai) No. 2002-249016 is folded through rolling and folding with pleats, so that a high-performance inflator is needed for quickly inflating the airbag.

In view of the problem described above, an object of the present invention is to provide a leg protection device in which an airbag is inflated quickly without increasing a capacity of a gas generator.

Further objects and advantages of the invention will be apparent from the following description of the invention.

SUMMARY OF THE INVENTION

In order to achieve the objects described above, according to a first aspect of the present invention, a leg protection device includes an airbag to be inflated in front of a leg portion of an occupant for protecting the leg portion; a casing for storing a folded airbag; and gas generating means for inflating the airbag. The airbag is formed of a front panel facing the occupant and a rear panel at the opposite side of the front panel when the airbag is inflated. The airbag has a folded portion folded between the front panel and the rear panel at a part of a perimeter of the airbag.

According to a second aspect of the present invention, in the leg protection device according to the first aspect, the part of the airbag folded inwardly between the front panel and the rear panel is formed at an upper portion thereof when the airbag is inflated.

According to a third aspect of the present invention, in the leg protection device according to the first aspect, the part of the airbag folded inwardly between the front panel and the rear panel is formed at a side portion thereof when the airbag is inflated.

According to a fourth aspect of the present invention, in the leg protection device according to the first aspect, the part of the airbag folded inwardly between the front panel and the rear panel is formed at an upper portion and side portion thereof when the airbag is inflated.

According to a fifth aspect of the present invention, in the leg protection device according to any of the second through fourth aspect, the part of the airbag folded inwardly between the front panel and the rear panel further is formed at a lower portion thereof when the airbag is inflated.

According to a sixth aspect of the present invention, in the leg protection device according to any of the first through fifth aspect, the part of the airbag folded inwardly between the front panel and the rear panel further includes a single pleated portion between the front panel and the rear panel.

According to a seventh aspect of the present invention, in the leg protection device according to any of the first through fifth aspect, the part of the airbag folded inwardly between the front panel and the rear panel further includes a portion pleated twice or more times between the front panel and the rear panel.

According to an eighth aspect of the present invention, in the leg protection device according to any of the first through the seventh aspect, the airbag is rolled into a rolled portion around an axis extending in a horizontal direction of the occupant, and left and right sides of the rolled portion are folded to form the folded portion of the airbag.

According to a ninth aspect of the present invention, in the leg protection device according to any of the first through the seventh aspect, the lower portion of the airbag is spread below the casing prior to folding, and the upper portion above the lower portion is rolled around an axis extending in the horizontal direction to form a rolled portion. The lower portion is folded over the rolled portion toward the occupant, and left and right sides of the rolled portion are folded over the lower portion toward the occupant to form the folded portion.

According to a tenth aspect of the present invention, in the leg protection device according to the eighth or the ninth aspect, the left and right sides of the rolled portion are folded with pleats to be stored in the casing.

According to an eleventh aspect of the present invention, in the leg protection device according to the eighth or the ninth aspect, the left and right sides of the rolled portion are rolled to be stored in the casing.

In the leg protection device of the present invention, the gas generating means inflates the airbag for receiving the leg portion of the occupant in case of emergency such as a collision of a vehicle. In the folded portion of the airbag, at least a part of the perimeter thereof is folded inwardly between the front panel and rear panel. Accordingly, just before the airbag is inflated completely, the part folded into the airbag extends and protrudes outwardly as if the part is discharged from an inner side of the airbag. In this case, the part folded into the airbag is forced to protrude outwardly due to a pressure of the gas in the airbag, so that the perimeter of the airbag folded into the airbag expands smoothly and quickly without increasing the pressure of the gas in the airbag.

In the present invention, the upper portion of the airbag upon completion of the inflation is folded inwardly between the front panel and the rear panel. In this case, the upper portion of the airbag extends smoothly and quickly just before the airbag is inflated completely.

In the present invention, the side portion of the airbag upon completion of the inflation is folded inwardly between the front panel and the rear panel. In this case, the side portion of the airbag extends smoothly and quickly just before the airbag is inflated completely.

In the present invention, the upper and side portions of the airbag upon completion of the inflation are folded inwardly between the front panel and the rear panel. In this case, the upper and side portions of the airbag extend smoothly and quickly just before the airbag is inflated completely.

In the present invention, the lower portion of the airbag as well as the upper and side portions thereof upon completion of the inflation is folded inwardly between the front panel and the rear panel. In this case, the lower portion of the airbag extends smoothly and quickly just before the airbag is inflated completely.

In the present invention, the perimeter of the folded portion of the airbag folded inwardly between the front panel and the rear panel includes the single pleated portion or the portion pleated twice or more times. In the case of the portion pleated twice or more times, the portion expands further smoothly and quickly just before the airbag is inflated completely. In the case of the single pleated portion, workability for folding the airbag is improved as compared with the portion pleated twice or more times.

In the present invention, the airbag is rolled around an axis extending in the horizontal direction of the occupant, and the left and right sides of the rolled portion are folded. Accordingly, the rolled portion has a smaller diameter since the rolled portion is formed first.

In the present invention, the lower portion of the airbag below the casing is spread prior to folding, and the upper portion above the lower portion is rolled into the rolled portion around an axis extending in the horizontal direction. The lower portion is folded over the rolled portion toward the occupant, and the left and the right sides of the rolled portion are folded over the lower portion toward the occupant to form the folded portion. When the airbag is inflated, the lower portion of the airbag is inflated first. The left and right sides of the rolled portion folded over the lower portion toward the occupant are pushed out from the casing while the lower portion of the airbag is inflated. Accordingly, the left and the right sides of the rolled portion come loose at an early stage of the inflation, so that the rolled portion expands smoothly and quickly.

In the present invention, the left and the right sides of the rolled portion are folded with pleats or are rolled to be stored in the casing. In the case of being folded with pleats, the airbag expands quickly in the horizontal direction. In the case of being rolled, the folded portion is firm when being stored in the casing, thereby improving workability.

BRIEF DESCRIPTION OF THE DRAWINGS

FIGS. 1(a) and 1(b) are explanatory views of a procedure of folding an airbag according to an embodiment of the present invention, wherein FIG. 1(a) is a front view of the airbag and FIG. 1(b) is a sectional view taken along line 1(b)—1(b) in FIG. 1(a);

FIGS. 2(a) and 2(b) are explanatory views of the procedure of folding the airbag according to the embodiment of the present invention, wherein FIG. 2(a) is a front view of the airbag and FIG. 2(b) is a sectional view taken along line 2(b)—2(b) in FIG. 2(a);

FIGS. 3(a) and 3(b) are explanatory views of the procedure of folding the airbag according to the embodiment of the present invention, wherein FIG. 3(a) is a front view of the airbag and FIG. 3(b) is a sectional view taken along line 3(b)—3(b) in FIG. 3(a);

FIGS. 4(a) and 4(b) are explanatory views of the procedure of folding the airbag according to the embodiment of the present invention, wherein FIG. 4(a) is a front view of the airbag and FIG. 4(b) is a sectional view taken along line 4(b)—4(b) in FIG. 4(a);

FIGS. 5(a) to 5(c) are explanatory views of the procedure of folding the airbag according to the embodiment of the present invention, wherein FIG. 5(a) is a front view of the airbag. FIG. 5(b) is a sectional view taken along line 5(b)—5(b) in FIG. 5(a), and FIG. 5(c) is a sectional view taken along line 5(c)—5(c) in FIG. 5(a);

FIGS. 6(a) and 6(b) are explanatory views of the procedure of folding the airbag according to the embodiment of the present invention, wherein FIG. 6(a) is a sectional view of the airbag and FIG. 6(b) is a view of the airbag seen along line 6(b)—6(b) in FIG. 6(a);

FIGS. 8(a) to 8(c) are explanatory views of the inflating process of the airbag according to the embodiment of the present invention, wherein FIG. 8(a) is a front view of the airbag, FIG. 8(b) is a sectional view taken along line 8(b)—8(b) in FIG. 8(a), and FIG. 8(c) is a sectional view taken along line 8(c)—8(c) in FIG. 8(a);

FIGS. 9(a) to 9(c) are explanatory views of a procedure of folding an airbag according to another embodiment of the present invention, wherein FIG. 9(a) is a front view of the airbag, FIG. 9(b) is a sectional view taken along line 9(b)—9(b) in FIG. 9(a), and FIG. 9(c) is a sectional view taken along line 9(c)—9(c) in FIG. 9(a);

FIGS. 10(a) and 10(b) are explanatory views of the procedure of folding the airbag according to the another embodiment of the present invention, wherein FIG. 10(a) is a sectional view of the airbag and FIG. 10(b) is a view of the airbag seen along line 10(b)—10(b) in FIG. 10(a);

FIGS. 11(a) and 11(b) are explanatory views of a procedure of folding an airbag according to a further embodiment of the present invention, wherein FIG. 11(a) is a front view of the airbag and FIG. 11(b) is a sectional view taken along line 11(b)—11(b) in FIG. 11(a);

FIGS. 12(a) and 12(b) are explanatory views of the procedure of folding the airbag according to the further embodiment of the present invention, wherein FIG. 12(a) is a front view of the airbag, and FIG. 12(b) is a sectional view taken along line 12(b)—12(b) in FIG. 12(a);

FIGS. 13(a) to 13(c) are explanatory views of the procedure of folding the airbag according to the further embodiment of the present invention, wherein FIG. 13(a) is a front view of the airbag, FIG. 13(b) is a sectional view taken along line 13(b)—13(b) in FIG. 13(a), and FIG. 13(c) is a sectional view taken along line 13(c)—13(c) in FIG. 13(a);

FIGS. 14(a) and 14(b) are explanatory views of the procedure of folding the airbag according to the further embodiment of the present invention, wherein FIG. 14(a) is a front view of the airbag and FIG. 14(b) is a sectional view taken along line 14(b)—14(b) in FIG. 14(a);

FIGS. 15(a) and 15(b) are explanatory views of the procedure of folding the airbag according to the further embodiment of the present invention, wherein FIG. 15(a) is a sectional view of the airbag, and FIG. 15(b) is a view of the airbag seen along line 15(b)—15(b) in FIG. 15(a);

FIGS. 16(a) and 16(b) are explanatory views of a procedure of folding an airbag according to a still further embodiment of the present invention, wherein FIG. 16(a) is a front view of the airbag and FIG. 16(b) is a sectional view taken along line 16(b)—16(b) in FIG. 16(a);

FIGS. 17(a) and 17(b) are explanatory views of the procedure of folding the airbag according to the still further embodiment of the present invention, wherein FIG. 17(a) is a front view of the airbag, and FIG. 17(b) is a sectional view taken along line 17(b)—17(b) in FIG. 17(a);

FIGS. 18(a) and 18(b) are explanatory views of the procedure of folding the airbag according to the still further embodiment of the present invention, wherein FIG. 18(a) is a front view of the airbag, and FIG. 18(b) is a sectional view taken along line 18(b)—18(b) in FIG. 18(a);

FIGS. 19(a) and 19(b) are explanatory views of the procedure of folding the airbag according to the still further embodiment of the present invention, wherein FIG. 19(a) is a front view of the airbag, and FIG. 19(b) is a sectional view taken along line 19(b)—19(b) in FIG. 19(a);

FIGS. 20(a) and 20(b) are explanatory views of the procedure of folding the airbag according to the still further embodiment of the present invention, wherein FIG. 20(a) is a front view of the airbag, and FIG. 20(b) is a sectional view taken along line 20(b)—20(b) in FIG. 20(a);

FIGS. 21(a) and 21(b) are explanatory views of the procedure of folding the airbag according to the still further embodiment of the present invention, wherein FIG. 21(a) is a front view of the airbag, and FIG. 21(b) is a sectional view taken along line 21(b)—21(b) in FIG. 21(a);

FIGS. 22(a) and 22(b) are explanatory views of the procedure of folding the airbag according to the still further embodiment of the present invention, wherein FIG. 22(a) is a front view of the airbag, and FIG. 22(b) is a sectional view taken along line 22(b)—22(b) in FIG. 22(a);

FIGS. 23(a) and 23(b) are explanatory views of the procedure of folding the airbag according to the still further embodiment of the present invention, wherein FIG. 23(a) is a front view of the airbag, and FIG. 23(b) is a sectional view taken along line 23(b)—23(b) in FIG. 23(a);

FIGS. 24(a) and 24(b) are explanatory views of the procedure of folding the airbag according to the still further embodiment of the present invention, wherein FIG. 24(a) is a front view of the airbag, and FIG. 24(b) is a sectional view taken along line 24(b)—24(b) in FIG. 24(a);

FIGS. 25(a) and 25(b) are explanatory views of the procedure of folding the airbag according to the still further embodiment of the present invention, wherein FIG. 25(a) is a front view of the airbag, and FIG. 25(b) is a sectional view taken along line 25(b)—25(b) in FIG. 25(a);

FIGS. 26(a) and 26(b) are explanatory views of the procedure of folding the airbag according to the still further embodiment of the present invention, wherein FIG. 26(a) is a front view of the airbag, and FIG. 26(b) is a sectional view of the airbag; and FIGS. 27(a) and 27(b) are explanatory views of the procedure of folding the airbag according to the still further embodiment of the present invention, wherein FIG. 27(a) is a front view of the airbag and FIG. 27(b) is a sectional view of the airbag.

DETAILED DESCRIPTION OF PREFERRED EMBODIMENTS

Hereunder, embodiments of the present invention will be explained with reference to the accompanying drawings. FIGS. 1(a), 1(b) through FIGS. 6(a), 6(b) are explanatory views showing a procedure of folding an airbag of a leg protection device. FIGS. 7(a) to 7(c) and 8(a), 8(b) are explanatory views showing an inflating process of the airbag.

In a leg protection device, an airbag (knee airbag) 1 includes a front panel 1j facing an occupant at the time of completion of inflation of the airbag 1, and a rear panel 1h on the opposite side of the front panel 1j. The airbag 1 is formed in a flat bag shape in which perimeters of the panels 1j and 1h are connected.

Figure 6A:
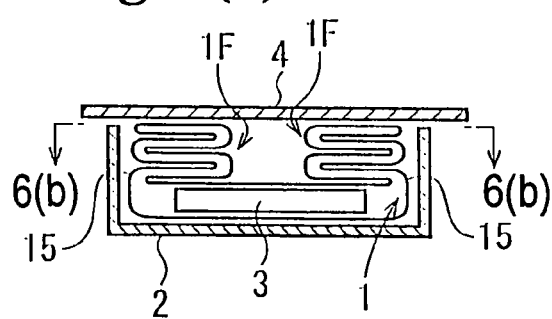
Figure 6B:
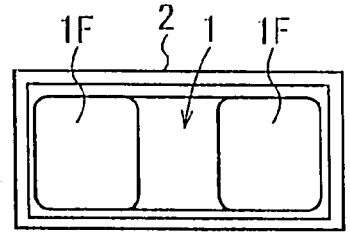

The leg protection device includes the airbag 1, a casing 2 for storing the folded airbag 1, an inflator 3 as a gas generator for inflating the airbag 1, a lid 4 (see FIG. 6(a)) for covering a front opening of the casing 2. The inflator 3 is disposed in the airbag 1. Stud bolts (not shown) protrude from the inflator 3 or a holder (not shown) for holding the inflator 3. The stud bolts pass through a lower portion of the rear panel 1h of the airbag 1 and a rear face of the casing 2, and fixed with nuts (not shown). By fixing the stud bolts with the nuts as described above, the inflator 3 is fixed to the casing 2, and an rear end of the airbag 1 is held between the inflator 3 or the holder thereof and the rear face of the casing 2.

A procedure of folding the airbag 1 will be explained next. The airbag 1 and the casing 2 are placed on a flat working bench, and the airbag 1 is spread flat on the bench. The airbag 1 is shown in a spread state along the vertical direction in FIGS. 1(a), 2(a), 3(a), 4(a), and 5(a), relative to a state that the leg protection device is installed in a vehicle. In FIGS. 1(a), 1(b), 2(a), 3(a), 3(b), 4(a), 4(b), 5(a), 5(b), and 6(b), the vertical direction matches a vertical direction of the leg protection device installed in a vehicle.

The airbag 1 is pulled out from the casing 2, and is spread flat. In the embodiment, the airbag 1 is spread upwardly from the casing 2. As shown in FIGS. 1(a) and 1(b), a portion along an upper side (upper end) of the airbag 1 is folded into the airbag 1 along a horizontal folding line 10, so that a pleated portion 1t is formed at the upper end of the airbag 1 between the front panel 1j and the rear panel 1h. Left and right sides (side ends) of the airbag 1 are folded inwardly into the airbag 1 along vertical pleat lines 11, so that pleated portions is and 1s are formed at the left and right side ends of the airbag 1 between the front panel 1j and the rear panel 1h, as shown in FIGS. 2(a) and 2(b).

Figure 3A:
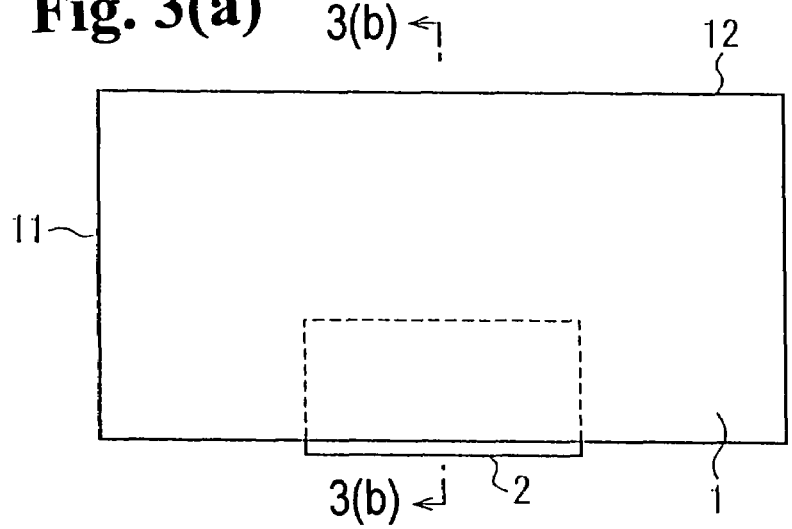
Figure 3B:
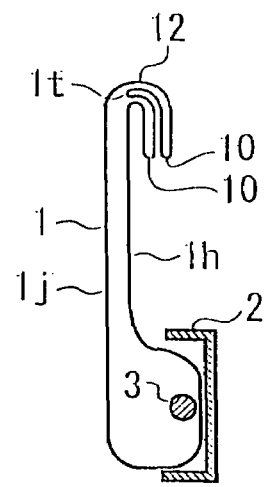

As shown in FIGS. 3(a) and 3(b), the airbag 1 is folded from a side of the front panel 1j to a side of the rear panel 1h along a horizontal folding line 12 away from the horizontal folding line 10 by a predetermined width (for example, 20 to 150 mm).

Figure 4A:
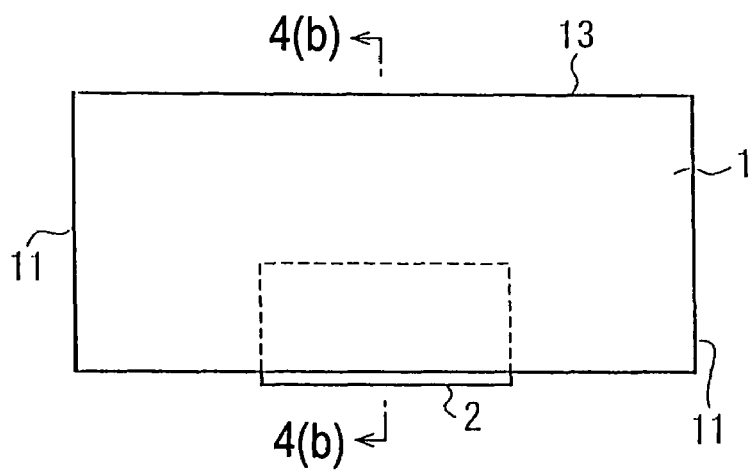
Figure 4B:
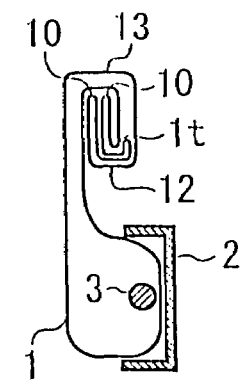
Figure 5A:
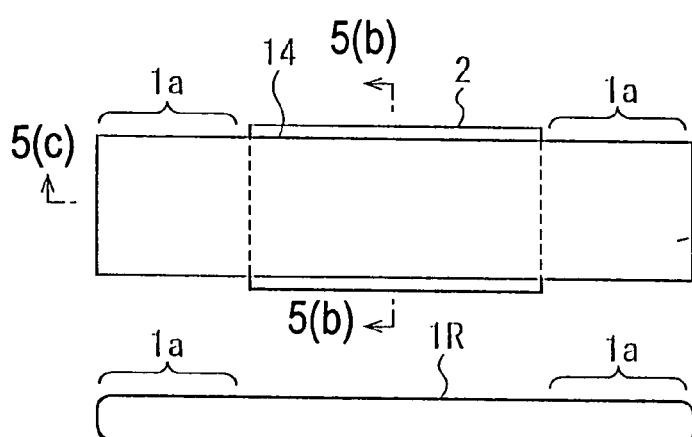
Figure 5B:
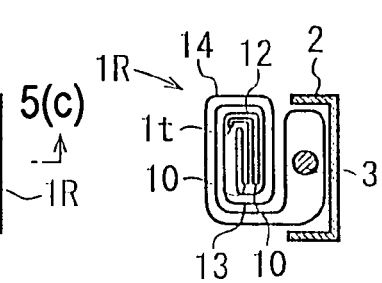

As shown in FIGS. 4(a) and 4(b), the airbag 1 is folded from the side of the front panel 1j to the side of the rear panel 1h along a horizontal folding line 13 away from the horizontal folding line 12 by a width substantially same as the predetermined width. As shown in FIGS. 5(a) and 5(b), the airbag 1 is folded from the side of the front panel 1j to the side of the rear panel 1h along a horizontal folding line 14 away from the horizontal folding line 13 by a width substantially same as the predetermined width. The airbag is folded along the folding lines 12, 13, and 14, in the same direction, thereby forming a rolled airbag intermediate folded portion (hereafter, referred to as rolled portion) 1R as shown in FIG. 5(b). FIG. 5(b) is a sectional view showing the rolled portion 1R rolled clockwise around the rolling center (folding line 10) taken along a front-rear direction of a vehicle in which an occupant is located at a left side thereof.

Figure 5C:
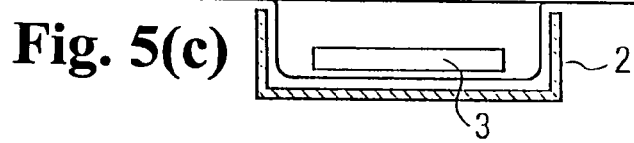

As shown in FIGS. 5(a) and 5(c), the rolled portion 1R has extending portions 1a extending from left and right sides of the casing 2. The extending portions 1a are folded at base portions (portions protruding from the casing 2) along the vertical folding lines 15 (see FIG. 6(a)) toward the occupant (upper side in FIG. 5(c) and FIG. 6(a)), such that the folded portions are folded over the rolled portion 1R toward the occupant. The remaining portions thereof are folded a zigzag shape toward the occupant to form a compact portion folded with pleats (hereafter, referred to as portion folded with pleats) 1F to be stored within the casing 2. The lid 4 is mounted on the casing 2, thereby completing the leg protection device.

In FIG. 5(c) and FIG. 6(a), the panels 1j and 1h rolled inwardly into the rolled portion 1R and each pleated portion 1s are not shown for easy viewing the drawings.

Figure 7A:
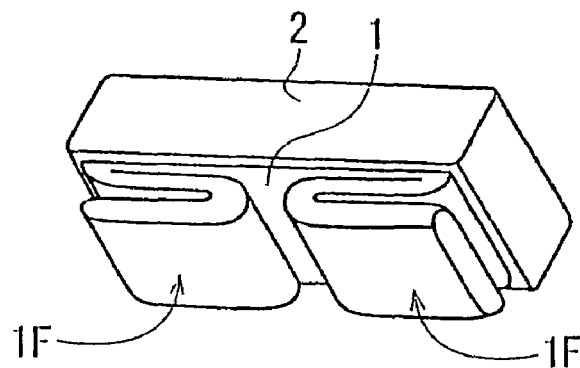
FIGS. 7(a) to 7(c) are explanatory views of an inflating process of the airbag according to the embodiment of the present invention.
Figure 7B:
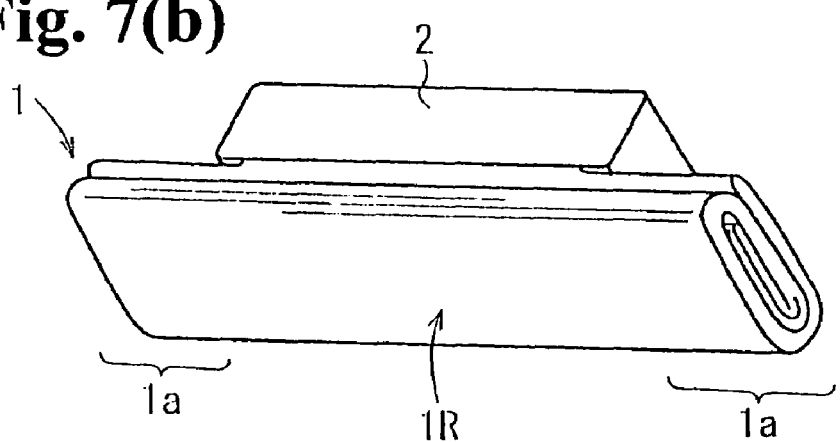

The leg protection device is installed in, for example, an interior panel in front of a seat, such that the lid 4 and the interior panel form a flat surface. When the inflator 3 is activated in case of collision of the automobile to inflate the airbag 1 of the leg protection device, the airbag 1 pushes the lid 4 to open and the pleated portion 1F of the airbag 1 protrudes in front of the casing 2 as shown in FIG. 7(a). As shown in FIG. 7(b), the portion folded with pleats 1F comes loose and extends in the horizontal direction of the legs of the occupant, and the rolled portion 1R of the airbag 1 extends upwardly.

Figure 7C:
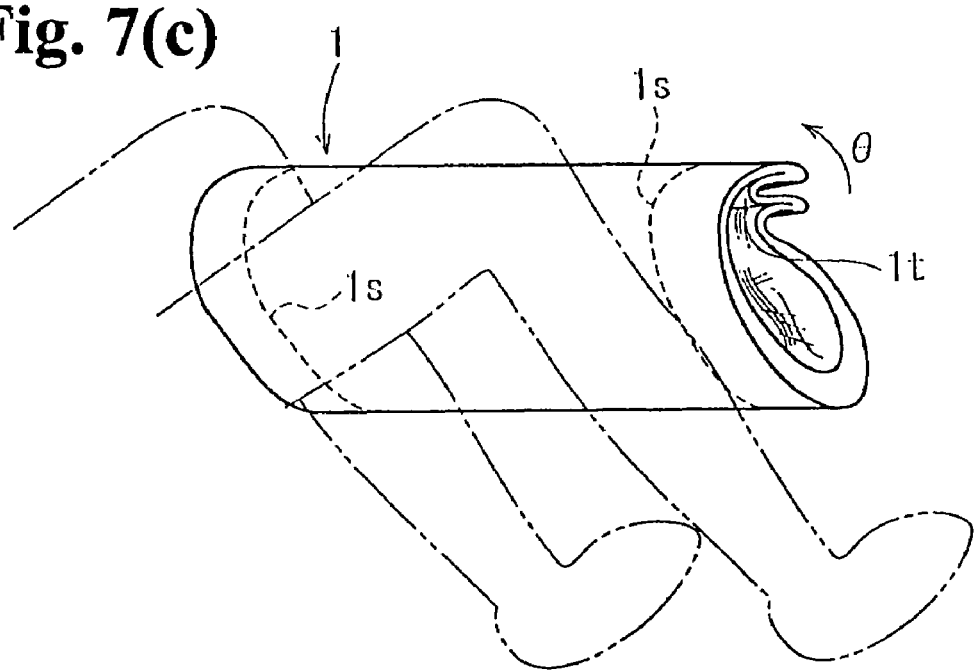
Figure 8A:
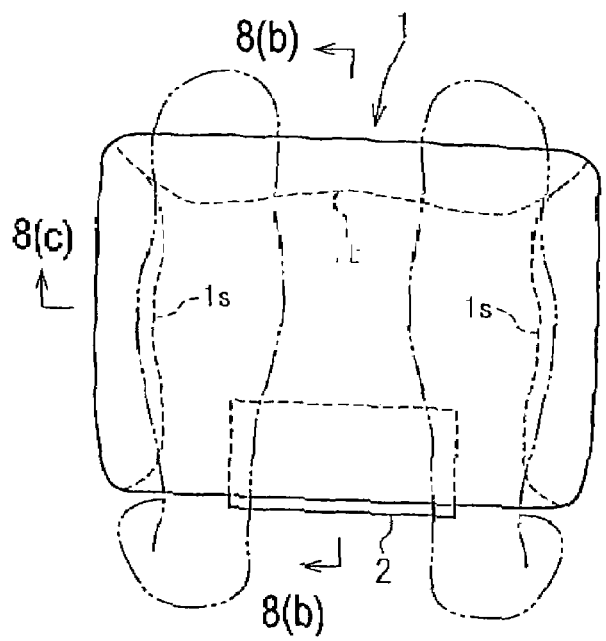
Figure 8B:
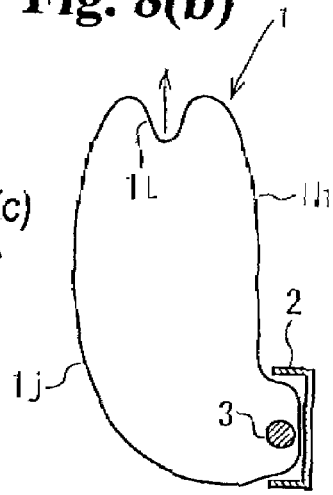
Figure 8C:
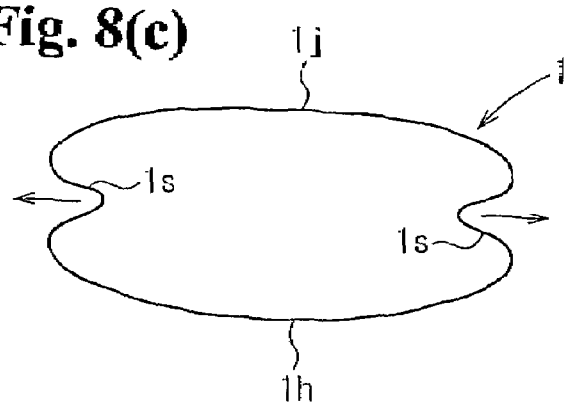

In a cross sectional view of the vehicle in which the occupant is on the left side thereof, the rolled portion 1R is rolled clockwise and extends upwardly in front of the legs of the occupant while rotating in the counterclockwise direction θ, as shown in FIG. 7(c). In this case, the rolled portion 1R comes loose and rotates in front of the legs, so that the rolled portion 1R smoothly extends without snagging in front of the legs. Just after the rolled portion 1R comes loose, the pleated portions 1t, 1s, and is folded in the airbag 1 at the upper end and the side ends thereof extend and protrude outwardly, as if the pleated portions are discharged from the inner side of the airbag 1, as shown in FIGS. 8(a) to 8(c), and the airbag 1 is completely inflated.

In the leg protection device, when the upper end and the left and right side ends of the airbag, i.e. the pleated portions 1t, 1s, and 1s folded into the airbag, are expanded, the upper end and the left and right side ends of the airbag are pushed outwardly due to the gas pressure in the airbag, thereby expanding the upper end and the left and right side ends of the airbag 1 smoothly and quickly without increasing a capacity of the inflator 3.

In the present embodiment, the airbag 1 is folded into the rolled portion 1R along the horizontal folding lines 12, 13, and 14, toward the rear panel 1h (rolled), and the extending portions 1a of the rolled portion 1R extending from the left and right sides of the casing 2 are folded over the rolled portion 1R toward the occupant. As described above, the airbag 1 is rolled into the rolled portion 1R, thereby reducing a diameter of the rolled portion 1R.

In the present embodiment, the extending portions 1a are folded with pleats to form the portion folded with pleats 1F to be stored within the casing 2, thereby expanding the extending portions 1a at the time of inflation of the airbag.

In the present embodiment, the pleated portions 1t, 1s, and 1s, are formed at the upper end and the left and the right ends of the airbag between the front panel 1j and the rear panel 1h of the airbag 1. As shown in FIGS. 9(a) and 9(b), the pleated portions 1t, 1s, and is may be folded three or more times. With such an arrangement, the pleated portions 1t, 1s, and 1s are folded three or more times, thereby expanding the upper end and the left and right side ends of the airbag further smoothly and quickly. The number of the pleated portions folding may be different at the upper end of the airbag and the left and right side ends thereof, or may be different at the left and right ends thereof.

FIG. 9(a) is a plan view corresponding to FIG. 2(a), and the airbag has the pleated portions 1t, 1s, and is folded three times. FIGS. 9(b) and 9(c) are sectional views taken along line 9(b)—9(b) and line 9(c)—9(c) in FIG. 9(a), respectively.

According to the present invention, the pleated portion may be formed at a corner of the airbag 1 other than the upper end or the side ends of the airbag. The pleated portion may be formed at only a single portion of the perimeter of the airbag or multiple portions thereof.

In the embodiment, after the pleated portions 1t, 1s, and 1s are formed, and the airbag 1 is rolled into the intermediate folded portion (rolled portion 1R). The intermediate folded portion may be formed with other folding methods, e.g. folding with pleats.

The extending portions 1a of the intermediate folded portion extending from the casing 2 may be folded with a folding method other than the method of folding with pleats. For example, as shown in FIGS. 10(a) and 10(b), the extending portions 1a (see FIGS. 5(a) and 5(b)) are folded along the vertical folding line 16 at the base end thereof toward the occupant (upper side in FIGS. 10(a) and 10(b)), and the remaining portions are rolled into compact rolled portions 1r to be stored within the casing 2. With such an arrangement, the rolled extending portions 1a are stored within the casing 2, so that the compact rolled portions 1r do not come loose, thereby improving workability.

FIG. 10(a) is a cross sectional view showing the airbag 1 in which the extending portions 1a extending from the casing 2 are rolled to be stored within the casing 2 similar to FIG. 6(a). FIG. 10(b) is a cross sectional view taken along line 10(b)—10(b) in FIG. 10(a).

A further embodiment will be explained with reference to FIGS. 11(a), 11(b) through FIGS. 15(a), 15(b). FIGS. 11(a), 11(b) through FIGS. 15(a), 15(b) are explanatory views of a procedure of folding an airbag of a leg protection device according to the further embodiment.

A procedure of folding an airbag 30 according to the present embodiment will be explained. In the present embodiment, the airbag 30 and the case 2 are placed on a flat working bench, and the airbag 30 is spread flat on the bench. The airbag 30 is shown in a spread state along the vertical direction in FIGS. 11(a), 12(a), 13(a), 14(a), and 15(a), relative to a state that the leg protection device is installed in a vehicle. In FIGS. 11(a), 11(b), 12(a), 13(a), 13(b), 14(a), 14(b), 15(a), and 15(b), the vertical direction matches a vertical direction of the leg protection device installed in a vehicle.

Figure 11A:
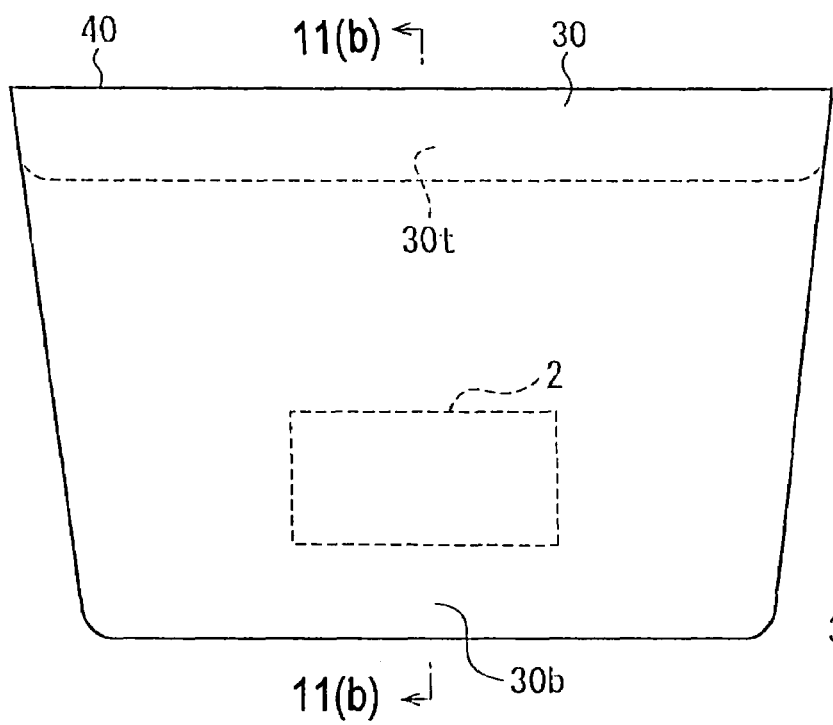
Figure 11B:
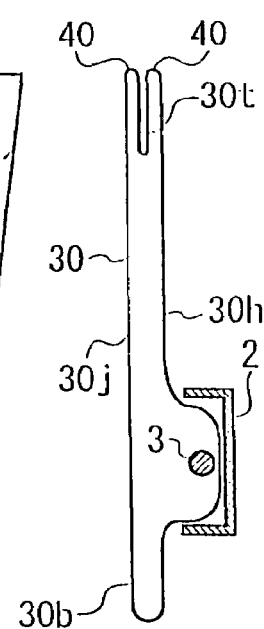

The airbag 30 is pulled out from the casing 2 and is spread flat. In the present embodiment, a lower portion 30b of the airbag 30 is spread downwardly from the casing 2, as shown in FIGS. 11(a) and 11(b). The airbag 30 is folded into the airbag 30 between a front panel 30j and a rear panel 30h along a horizontal folding line 40 to form a pleated portion 30t.

Figure 12A:
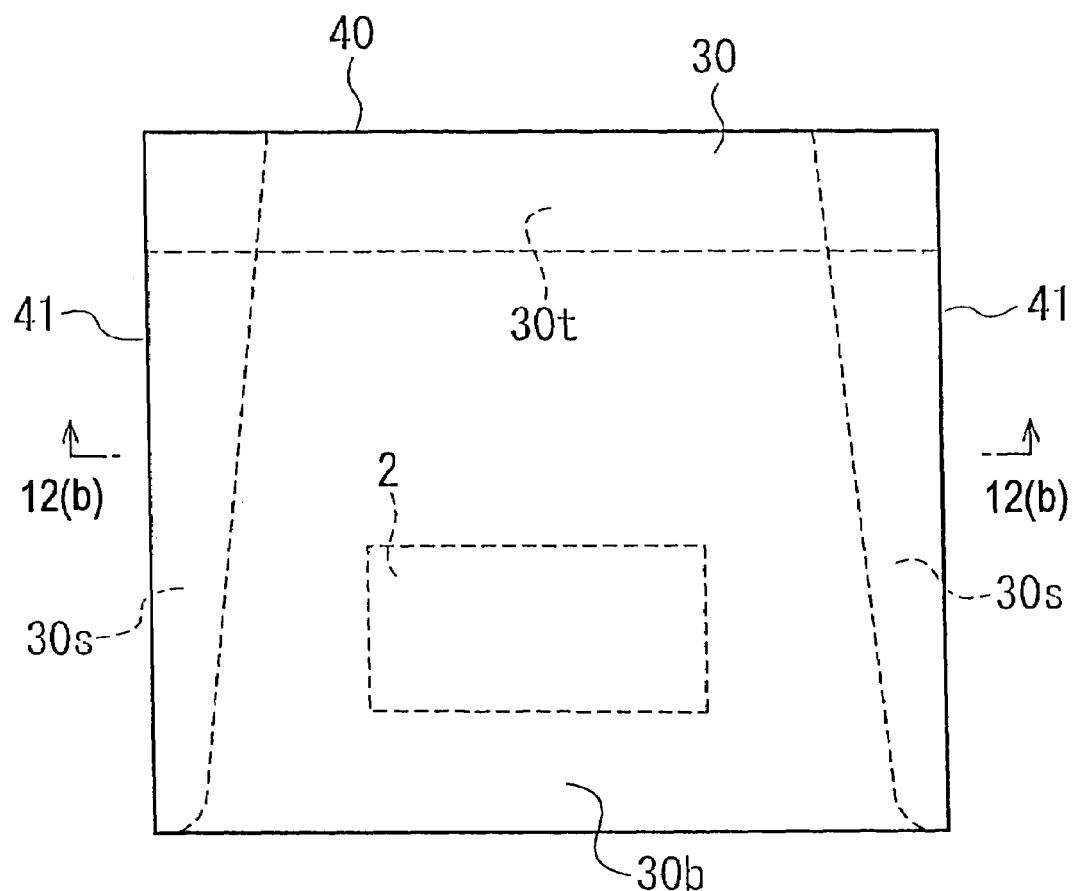
Figure 12B:
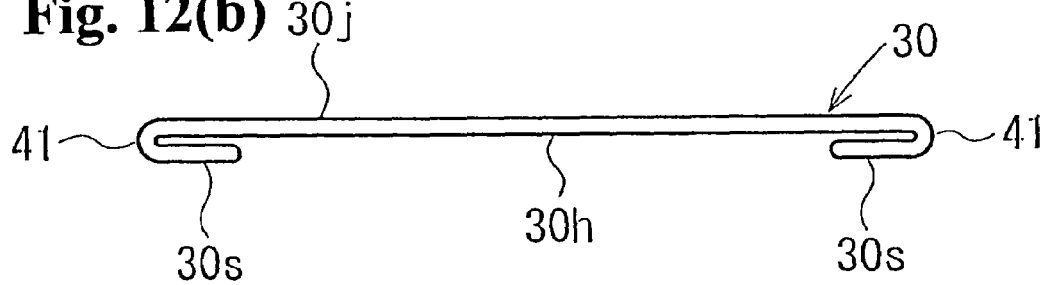
Figure 15A:
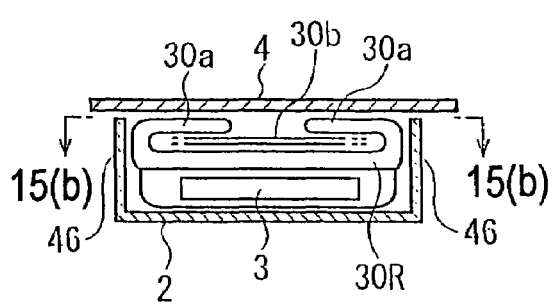
Figure 15B:
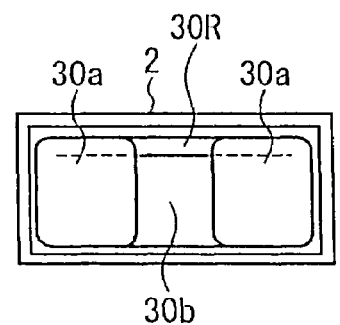

A left side 30s and a right side 30s of the airbag 30 are folded toward the rear panel 30h along vertical folding lines 41 and 41, respectively, as shown in FIGS. 12(a) and 12(b).

As shown in FIG. 13(b), the airbag 30 is folded toward the rear panel 30h along a horizontal folding line 42 away from the horizontal folding line 40 by a predetermined width, and is further folded toward the rear panel 30h along a horizontal folding line 43 away from the horizontal folding line 42 by a width same as the predetermined width. The airbag 30 is further folded toward the rear panel 30h along a horizontal folding line 44 away from the horizontal folding line 43 by a width same as the predetermined width.

A portion of the airbag 30 from the horizontal folding line 40 to the front face of the casing 2, i.e. an upper portion of the airbag 30 from the lower portion 30b, is folded toward the rear panel 30h in a roll shape to form a rolled portion 30R. The rolled portion 30R is rolled clockwise around a rolling center (folding line 40) in a cross-sectional view of the vehicle in the front-to-rear direction with the occupant at the left side thereof (FIG. 13(*b*)), similar to the rolled portion 1R of the airbag 1 shown in FIGS. 1(*a*) through 8(*c*).

As shown in FIGS. 14(*a*) and 14(*b*), the lower portion 30*b* of the airbag 30 is folded over a face of the rolled portion 30R facing the occupant side at a base end thereof along a horizontal folding line 45 toward the occupant (left side in FIG. 14(*b*)).

As shown in FIG. 13(*a*), FIG. 13(*c*), and FIG. 14(*a*), extending portions 30*a* and 30*a* of the rolled portion 30R extending from the left and right sides of the casing 2 are folded over the face of the lower portion 30*b* facing the occupant side at base ends thereof (portions where the extending portions 30*a* protrude from the casing 2) along vertical folding lines 46 and 46 (see FIG. 15(*a*)) toward the occupant (upper side in FIG. 15(*a*)), and the rolled portion 30R is stored within the casing 2. The lid 4 is mounted on the casing 2, whereby completing the leg protection device.

Note that the panels 30*j* and 30*h*, and the side portions 30*s* and 30*s* rolled inward into the rolled portion 30R are not shown in FIG. 13(*c*) and FIG. 15(*a*) for easy viewing the drawings.

Other configuration of the leg protection device is the same as that of the leg protection device shown in FIGS. 1(*a*) through 8(*c*) described above. The leg protection device according to the present embodiment is installed in, for example, an interior panel in front of a seat such that the lid 4 and the interior panel form a flat face.

In case of collision of the automobile, the inflator 3 is activated to inflate the airbag 30 of the leg protection device, and the gas from the inflator 3 flows into the lower portion 30*b* of the airbag 30, thereby inflating the lower portion 30*b*. The extending portions 30*a* and 30*a* folded over the lower portion 30*b* and extending from the left and right sides of the rolled portion 30R are pressed toward the occupant side to press the lid 4 to open due to the inflation of the lower portion 30*b*. The extending portions 30*a* and 30*a* expand toward the left and right sides of the casing 2. The lower portion 30*b* expands downwardly from the casing 2, while the extending portions 30*a* and 30*a* protrude from the casing 2. Subsequently, the rolled portion 30R extends upwardly.

In the present embodiment, the rolled portion 30R is rolled clockwise in the longitudinal cross-sectional view of the vehicle with the occupant on the left side thereof. Accordingly, the rolled portion 30R smoothly extends upwardly in front of the legs of the occupant without snagging in front of the leg portions of the occupant while rotating in the counterclockwise direction in the cross-sectional view such that the rolled portion 30R rotates in front of the leg portions of the occupant. The left and right side portions 30*s* and 30*s* of the airbag 30 expand in the side directions of the airbag from the sides of the lower portion of the airbag, while the rolled portion 30R expands upwardly.

When the rolled portion 30R comes loose, the pleated portions 30*t* folded into the airbag 30 at the upper end of the airbag extend outwardly from the inner side of the airbag 30, so that the airbag 30 is completely expanded.

In the leg protection device, when the upper end of the airbag folded into the airbag 30 as the pleated portion 30*t* expands outwardly from the airbag, the upper end of the airbag is forced outwardly due to the gas pressure within the airbag, thereby expanding the upper end from the airbag smoothly and quickly without increasing the pressure of the gas within the airbag, i.e. without increasing the capacity of the inflator 3.

In the present embodiment, the lower portion 30*b* of the airbag 30 below the casing 2 is spread prior to folding of the airbag 30, and the portion above the lower portion 30*b* is rolled around the horizontal rolling axis into the rolled portion 30R. The lower portion 30*b* is folded over the rolled portion 30R toward the occupant. The extending portions 30*a* and 30*a* extending from the left and right sides of the rolled portion 30R are folded over the lower portion 30*b* toward the occupant, and the folded airbag 30 is stored within the casing 2. Accordingly, when the airbag 30 is inflated, the lower portion 30*b* is inflated first, and the extending portions 30*a* and 30*a* folded over the lower portion 30*b* are pushed out from the casing 2 due to the inflation of the lower portion 30*b*. Thus, the left and right sides of the rolled portions 30R of the rolled portion 30R come loose at the early stage of the inflation of the airbag 30, thereby expanding the rolled portion 30R quickly.

In the present embodiment, the left and right sides 30*s* and 30*s* of the airbag 30 are folded toward the rear panel 30*h* of the airbag 30 without forming pleated portions at the left and right sides 30*s* and 30*s* folded toward the inner side of the airbag 30. The pleated portions may be formed at the left and right sides 30*s* and 30*s* folded toward the inner side of the airbag 30.

Figure 16A:
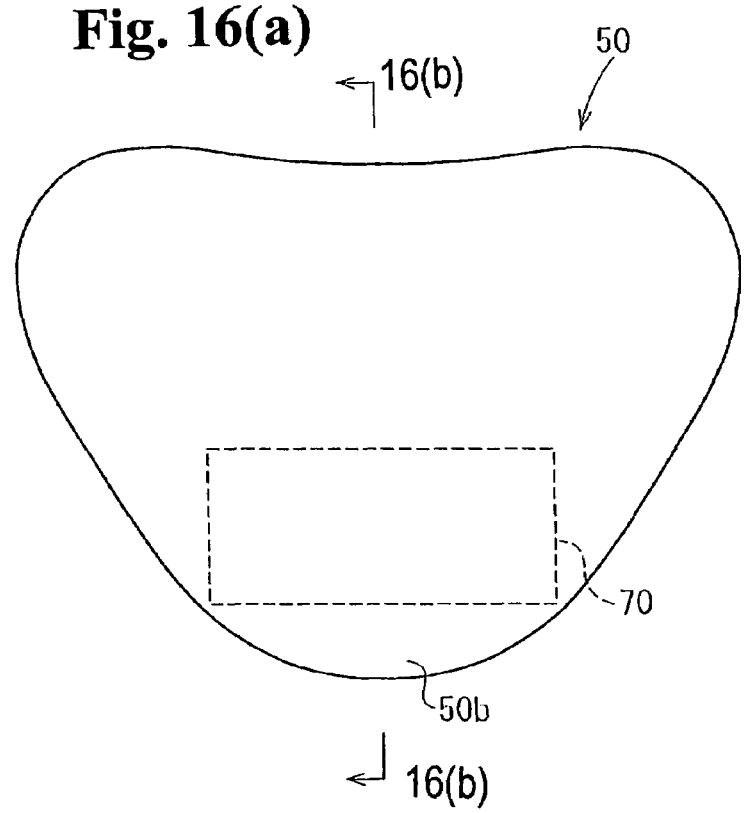
Figure 16B:
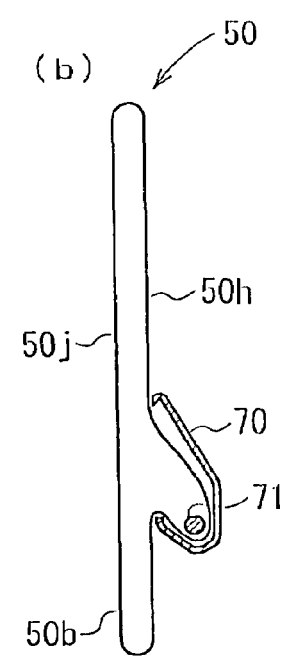

A still further embodiment will be explained with reference to FIGS. 16(*a*) through 27(*b*). FIGS. 16(*a*) through 27(*b*) are explanatory views showing a procedure of folding an airbag of a leg protection device according to the still further embodiment.

In the present embodiment, as shown in FIG. 16(*a*), an airbag 50 is formed in a shape having a width in the horizontal direction decreasing toward a lower side. The airbag 50 includes a casing 70 connected to a rear panel 50*h* around the lower portion of the airbag 50 for storing the folded airbag 50. Reference numeral 71 denotes an inflator for inflating the airbag 50. The inflator 71 is installed in the airbag 50.

Stud bolts (not shown) protrude from the inflator 71 or a holder (not shown) for holding the inflator 71. The stud bolts pass through a lower portion of the rear panel 50*h* of the airbag 50 and a rear face of the casing 70, and fixed with nuts (not shown). By fixing the stud bolts with the nuts as described above, the inflator 71 is fixed to the casing 70, and an rear end of the airbag 50 is held between the inflator 71 or the holder thereof and the rear face of the casing 70.

In the present embodiment, when the airbag 50 is inflated, a lower portion 50*b* of the airbag 50 below the casing 70 expands. A pleated portion 50*p* (see FIG. 26(*b*)) is formed in the lower portion 50*b* when the airbag 50 is folded.

A procedure of folding the airbag 50 will be explained next. In the present embodiment, the airbag 50 and the case 70 are placed on a flat working bench, and the airbag 50 is spread flat on the bench. The airbag 50 is shown in a spread state along the vertical direction in FIGS. 16(*a*), 17(*a*), 18(*a*), 19(*a*), 20(*a*), 21(*a*), 22(*a*), 23(*a*), 24(*a*), 25(*a*), 26(*a*) and 27(*a*), relative to a state that the leg protection device is installed in a vehicle. In FIGS. 16(*a*), 16(*b*), 17(*a*), 17(*b*), 18(*a*), 19(*a*) through 27(*a*), the vertical direction matches a vertical direction of the leg protection device installed in a vehicle.

The airbag 50 is pulled out from the casing 70, and is spread flat. The lower portion 50*b* of the airbag 50 is spread downwardly from the casing 70, as shown in FIGS. 16(*a*) and 16(*b*).

As shown in FIGS. 17(*a*) and 17(*b*), the airbag 50 is folded along a horizontal folding line 51 such that an upper side of the airbag 50 is taken into the airbag 50 between a front panel 50*j* and a rear panel 50*h* to form a pleated portion 50*t*.

As shown in FIGS. 18(*a*) and 18(*b*), a left side 50*s* and a right side 50*s* of the airbag 50 are folded toward the rear panel 50*h* along vertical folding lines 52 and 52, respectively.

Figure 19A:
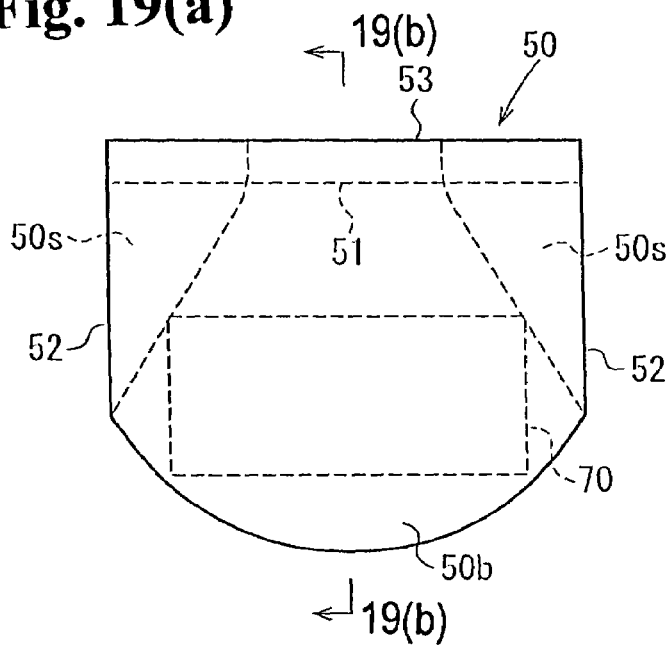
Figure 19B:
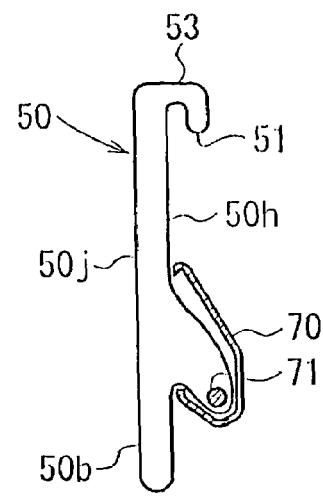
Figure 20A:
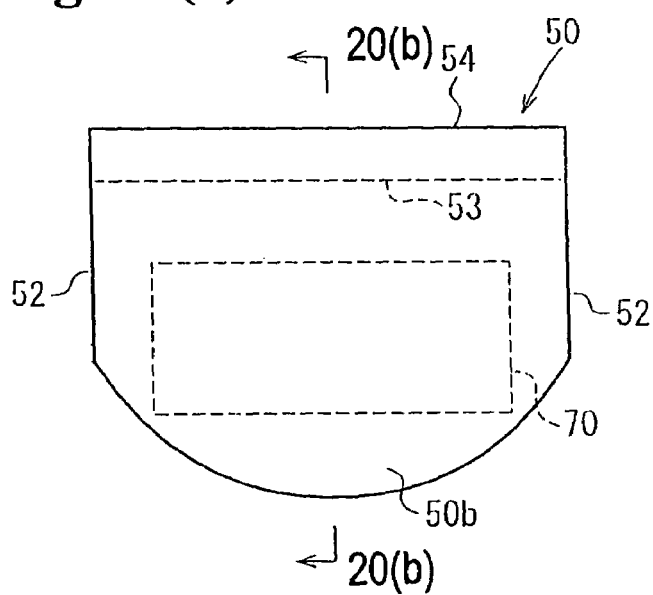
Figure 20B:
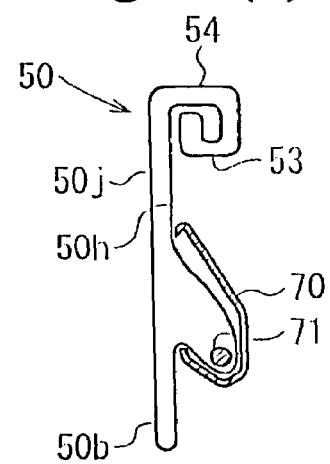

As shown in FIGS. 19(*a*) through 20(*b*), the airbag 50 is folded toward the rear panel 50*h* along a horizontal folding line 53 away from the aforementioned horizontal folding line 51 by a predetermined width (FIG. 19(*a*)). The airbag 50 is further folded toward the rear panel 50*h* along a horizontal folding line 54 away from the aforementioned horizontal folding line 53 by a predetermined width (FIG. 20(*a*)). As described above, the airbag 50 is folded along the horizontal folding lines 53 and 54 toward the rear panel 50*h*. Accordingly, a portion of the airbag 50 extending above the casing 70 is rolled around the horizontal folding line 51 toward the casing 70, thereby forming a rolled portion 50R.

Figure 21A:
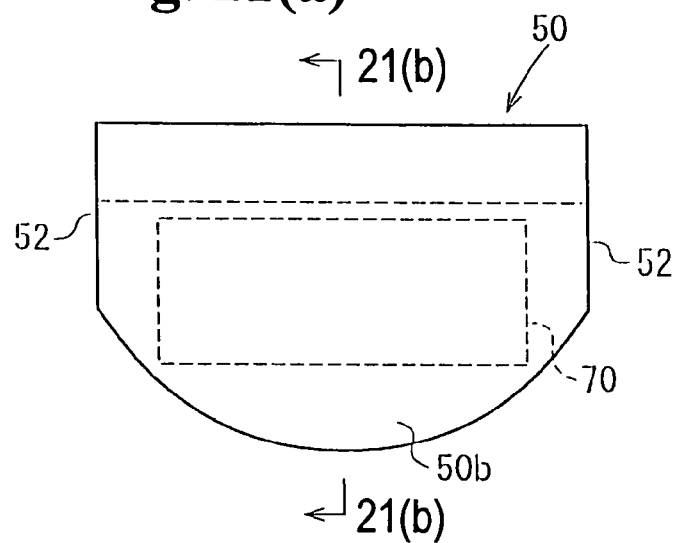
Figure 21B:
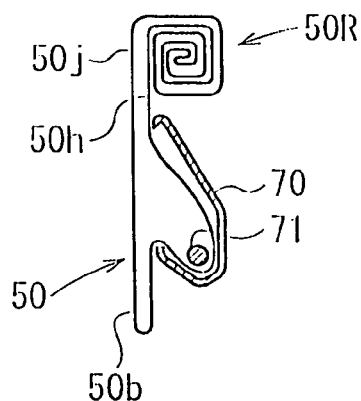
Figure 22A:
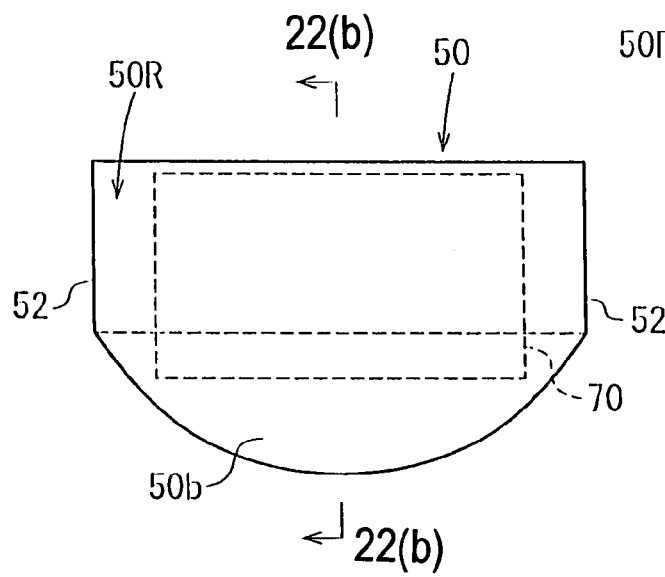
Figure 22B:
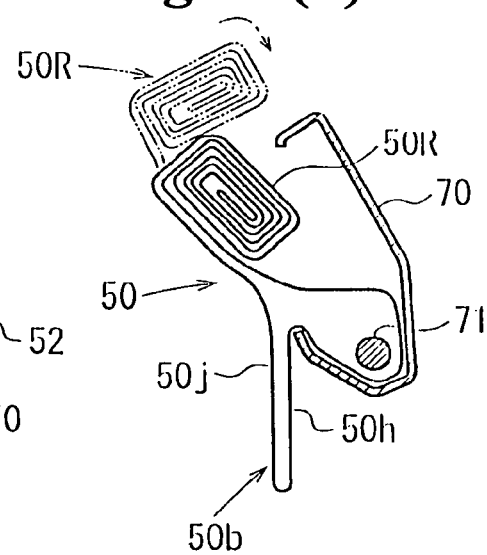
Figure 23A:
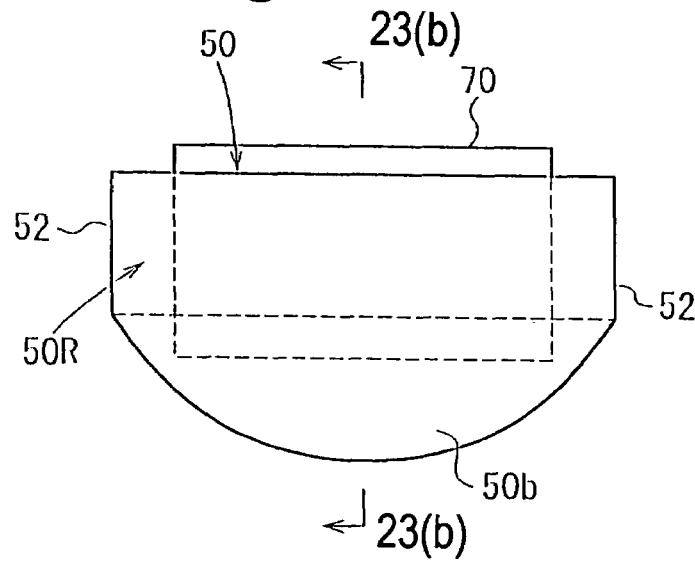
Figure 23B:
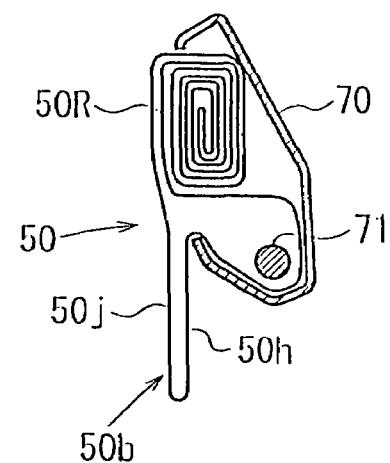

As shown in FIG. 21(*a*) through 23(*b*), the remaining portion of the rolled portion 50R is further rolled along horizontal folding lines (reference numerals omitted) after rolled along the horizontal folding line 54 up to the front face of the casing 70. Thus, the entire portion of the airbag 50 above the casing 70 except the lower portion 50*b* forms the rolled portion 50R.

Note that the pleated portion 50*t* formed at the upper side of the airbag 50 is not shown in FIGS. 19(*a*) through 26(*b*) for easy viewing of the drawings.

Figure 24A:
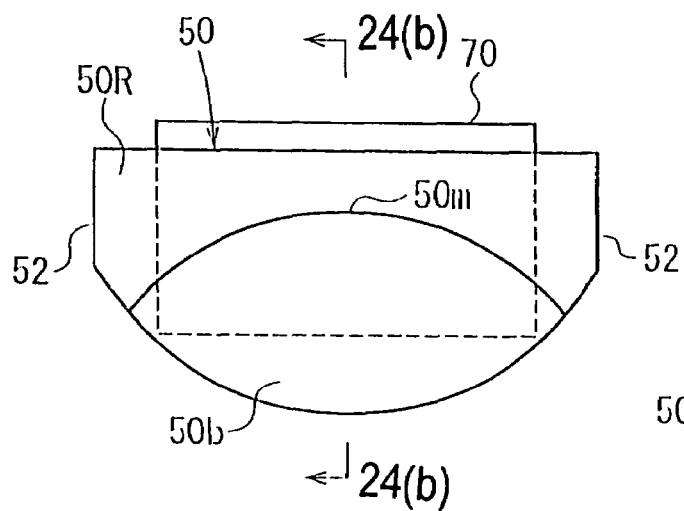
Figure 24B:
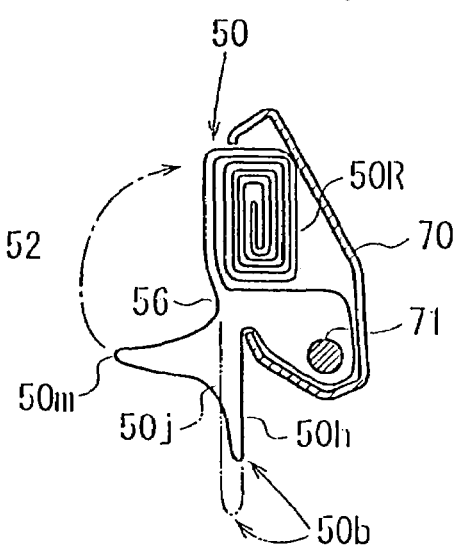
Figure 25A:
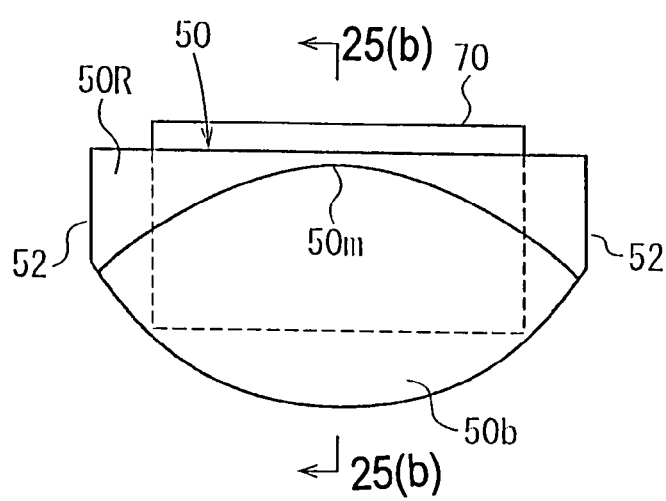
Figure 25B:
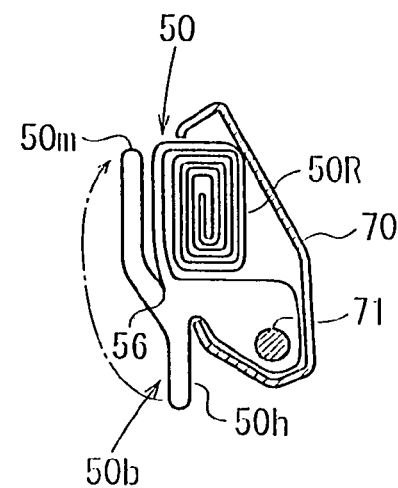

As shown in FIGS. 24(*a*) through 25(*b*), the lower portion 50*b* of the front panel 50*j* is picked up toward front (occupant side) away from the front panel 50*h* to form an intermediate protrusion 50*m* (FIG. 24(*a*)). A portion from the intermediate protrusion 50*m* to a border between the lower portion 50*b* and the rolled portion 50R is folded upwardly over the front face of the rolled portion 50R along a horizontal folding line 56 (FIG. 25(*a*)). The remaining portion from the intermediate protrusion 50*m* to the rear panel 50*h* is folded downwardly along the intermediate protrusion 50*m*.

Figure 26A:
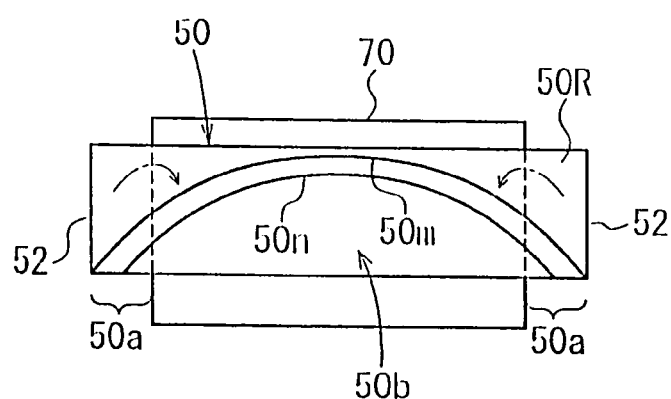
Figure 26B:
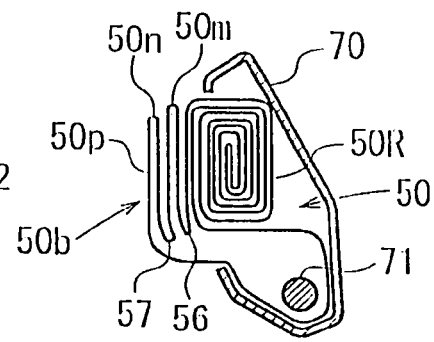

As shown in FIG. 26(*a*), the portion having a predetermined width below the intermediate protrusion 50*m* is folded upwardly along a horizontal folding line 57. The remaining portion from the horizontal folding line 57 is folded upwardly from the horizontal folding line 57 over the front face of the portion between the intermediate protrusion 50*m* and the horizontal folding line 57 to form a double-folded lower portion.

As shown in FIG. 26(*b*), a portion of the lower portion 50*b* of the airbag 50 between the intermediate protrusions 50*m* and 50*n* is folded into the airbag, so that the pleated portion 50*p* is formed at the lower portion 50*b*.

Figure 27A:
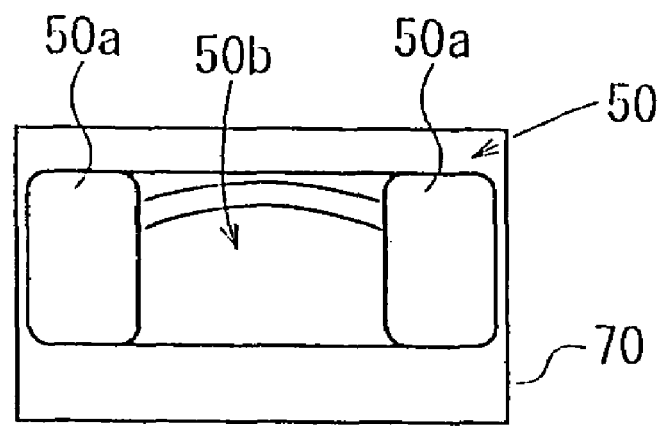
Figure 27B:
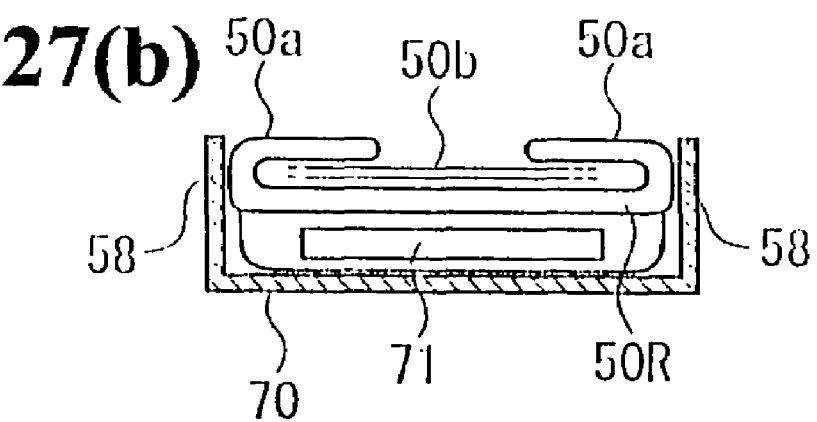

As shown in FIG. 26(*a*), extending portions 50*a* and 50*a* of the rolled portion 50R extending from the left and right sides of the casing 70 are folded over a front face of the lower portion 50*b* at base ends thereof (portions protruding from the casing 70) along vertical folding lines 58 and 58 (see FIG. 27(*b*)) toward front (upper side in FIG. 27(*b*)), and the rolled portion 50R is stored within the casing 70. A lid (not shown) is mounted on the casing 70, thereby forming the leg protection device.

Note that the panels 50*j* and 50*h*, and the side portions 50*s* and 50*s* rolled inwardly into the rolled portion 50R are not shown in FIG. 27(*b*) for easy viewing of the drawings.

Other configuration of the leg protection device is the same as that of the leg protection device shown in FIGS. 1(*a*) through 8(*c*). The leg protection device according to the present embodiment is installed in, for example, an interior panel in front of a seat such that the lid and the interior panel form a flat face.

According to the present embodiment, in case of collision of the automobile, when the inflator 71 is activated to inflate the airbag 50 of the leg protection device, the gas emitted from the inflator 71 flows into the lower portion 50*b* of the airbag 50, thereby inflating the lower portion 50*b* first. The extending portions 50*a* and 50*a* extending from the left and right sides of the rolled portion 50R and folded over the front face of the lower portion 50*b* are pressed to the occupant side due to the inflation of the lower portion 50*b* so as to press the lid to open. The extending portions 50*a* and 50*a* expand to the left and right sides of the casing 70. The lower portion 50*b* expands downwardly from the casing 70, while the extending portions 50*a* and 50*a* protrude from the casing 70. In the present embodiment, just after the lower portion 50*b* comes loose, the pleated portion 50*p* of the lower portion 50*b* folded into the airbag 50 extends and protrudes from the inner side of the airbag 50.

After the lower portion 50*b* expands downwardly from the casing 70, the rolled portion 50R extends upwardly. The rolled portion 50R smoothly extends upwardly in front of the legs of the occupant without snagging while rotating in the counterclockwise direction in front of the leg portions of the occupant. The left and right side portions 50*s* and 50*s* of the airbag 50 expand laterally from the sides of the lower portion of the airbag, while the rolled portion 50R extends upwardly. Just after the rolled portion 50R comes loose, the pleated portions 50*t* folded into the airbag 50 at the upper end of the airbag extends and protrudes outwardly from the inner side of the airbag 50, so that the airbag 50 is inflated completely.

In the leg protection device, the lower portion 50*b* of the airbag is folded into the airbag 50 to form the pleated portion 50*p*, and the upper portion of the airbag being folded into the airbag 50 to form the pleated portion 50*t*. Accordingly, when the upper portion and the lower portion 50*b* of the airbag extend outwardly from the airbag, the upper portion and lower portion 50*b* of the airbag are forced outwardly due to the gas pressure in the airbag, thereby expanding the upper portion and the lower portion 50*b* of the airbag smoothly and quickly without increasing the gas pressure in the airbag, i.e. without increasing the capacity of the inflator 71.

In the present embodiment, the left and right sides 50*s* and 50*s* of the airbag 50 are folded toward the rear panel 50*h* of the airbag 50 without forming a pleated portion. The left and right sides 50*s* and 50*s* may be folded into the airbag 50 to form pleated portions.

While the invention has been explained with reference to the specific embodiments of the invention, the explanation is illustrative and the invention is limited only by the appended claims.

What is claimed is:

1. A leg protection device for protecting a leg of an occupant in a vehicle, comprising:
   a casing,
   an airbag disposed in the casing in a folded state to be inflated in front of the leg of the occupant, said airbag having a front portion facing the occupant and a rear portion opposite to the front portion in an inflated state, and
   gas generating device attached to the airbag for inflating the airbag,
   wherein said airbag comprises an upper folded portion folded between the front portion and the rear portion at an upper side of the airbag in a spread state of the airbag, left and right side portions folded over a center area of the airbag with the upper folded portion such that parts of the left and right side portions to be folded later are located laterally outside the casing in a partly folded state of the airbag, and an intermediate folded portion, in another partly folded state of the airbag, having a width to be able to enter into the casing in a direction perpendicular to the left and right side portions, said intermediate folded portion being obtained by folding rearwardly a part of the airbag with the upper folded portion and the left and right side portions several times, said parts of the left and right side portions located laterally outside the casing being folded on a center area to be completely disposed inside the casing in the folded state, and wherein said upper folded portion includes a pleated portion in which a perimeter of the airbag is folded at least once inwardly between the front portion and the rear portion.

2. A leg protection device according to claim 1, wherein each of said left and right side portions has a folded portion folded between the front portion and the rear portion in the spread state of the airbag.

3. A leg protection device according to claim 1, wherein said airbag further includes a lower folded portion formed at a lower side of the airbag.

4. A leg protection device according to claim 1, wherein said airbag includes a rolled portion rolled along a horizontal direction relative to the occupant in the folded state, said rolled portion having folded left and right sides.

5. A leg protection device according to claim 4, wherein said folded left and right sides are folded with pleats or rolled.

6. A leg protection device according to claim 4, wherein said airbag is arranged such that the upper folded portion expands outwardly between the front and rear portions after the rolled portion is unrolled.

7. A leg protection device for protecting a leg of an occupant in a vehicle, comprising:
   a casing,
   an airbag disposed in the casing in a folded state to be inflated in front of the leg of the occupant, said airbag having a front portion facing the occupant and a rear portion opposite to the front portion in an inflated state, and
   gas generating device attached to the airbag for inflating the airbag,
   wherein said airbag comprises an upper folded portion folded between the front portion and the rear portion at an upper side of the airbag in a spread state of the airbag, left and right side portions folded over a center area of the airbag with the upper folded portion such that parts of the left and right side portions to be folded later are located laterally outside the casing in a partly folded state of the airbag, and an intermediate folded portion, in another partly folded state of the airbag, having a width to be able to enter into the casing in a direction perpendicular to the left and right side portions, said intermediate folded portion being obtained by folding rearwardly a part of the airbag with the upper folded portion and the left and right side portions several times, said parts of the left and right side portions located laterally outside the casing being folded on a center area to be completely disposed inside the casing in the folded state, and wherein said airbag includes an upper portion rolled along a horizontal direction relative to the occupant and a lower portion folded over the upper portion in the folded state, said rolled upper portion having folded left and right sides disposed above the folded lower portion.

8. A leg protection device according to claim 7, wherein said folded left and right sides are folded with pleats or rolled.

9. A leg protection device for protecting a leg of an occupant in a vehicle, comprising:
   a casing,
   an airbag disposed in the casing in a folded state to be inflated in front of the leg of the occupant, said airbag having a front portion facing the occupant and a rear portion opposite to the front portion in an inflated state, and
   gas generating device attached to the airbag for inflating the airbag,
   wherein said airbag comprises an upper folded portion folded between the front portion and the rear portion at an upper side of the airbag in a spread state of the airbag, left and right side portions folded over a center area of the airbag with the upper folded portion such that parts of the left and right side portions to be folded later are located laterally outside the casing in a partly folded state of the airbag, and an intermediate folded portion, in another partly folded state of the airbag, having a width to be able to enter into the casing in a direction perpendicular to the left and right side portions, said intermediate folded portion being obtained by folding rearwardly a part of the airbag with the upper folded portion and the left and right side portions several times, said parts of the left and right side portions located laterally outside the casing being folded on a center area to be completely disposed inside the casing in the folded state,
   wherein said parts of the left and right side portions in the intermediate folded portion are folded at least once to be located in the casing, and
   wherein said airbag includes a lower portion located below the casing in the spread state, said lower portion having a portion folded between the front portion and the rear portion and being located above the intermediate folded portion when the intermediate folded portion is formed and disposed in the casing.

10. A leg protection device according to claim 9, wherein said parts of the left and right side portions are folded once to be located inside the casing.

* * * * *